May 8, 1951          F. R. BRIDGER, JR          2,551,870
FLEXIBLE TRACTOR PLANTER ATTACHING ASSEMBLY
Filed Oct. 22, 1948          2 Sheets-Sheet 2
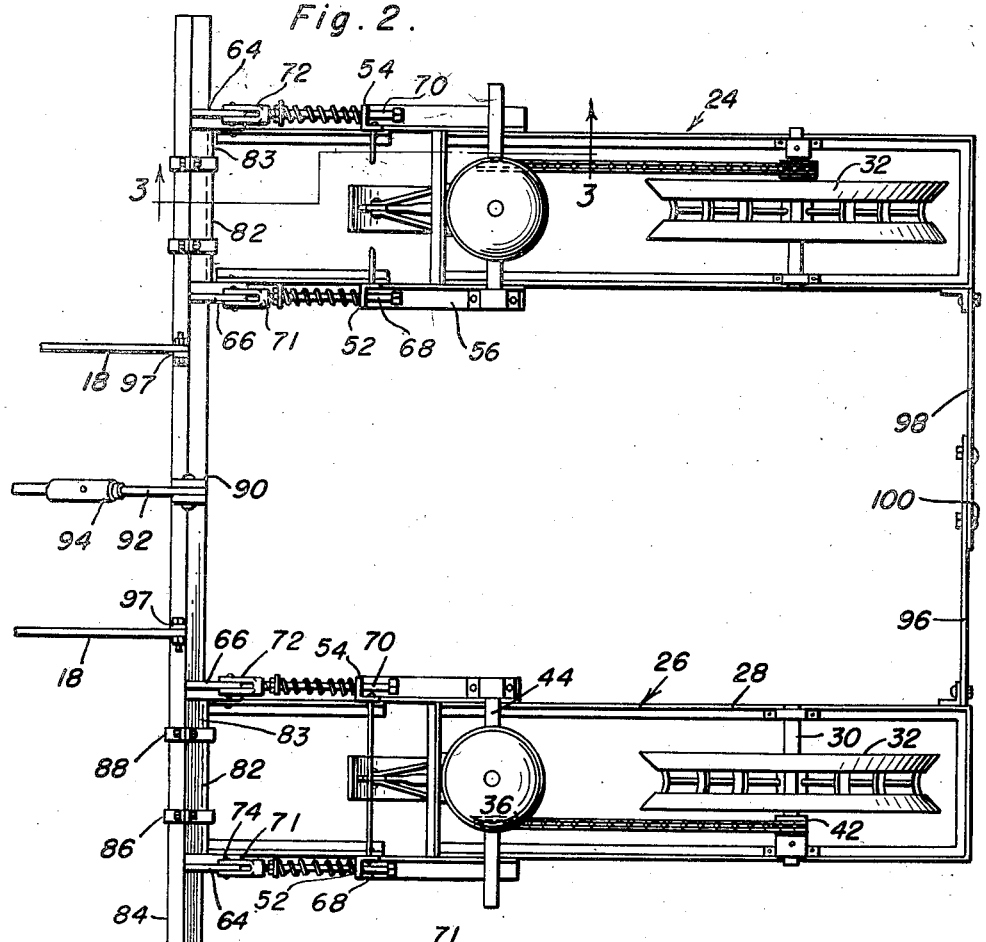
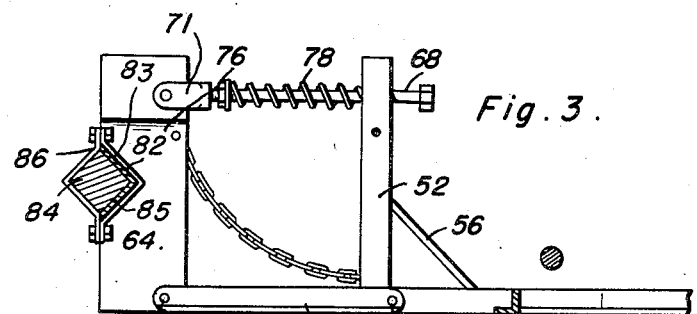
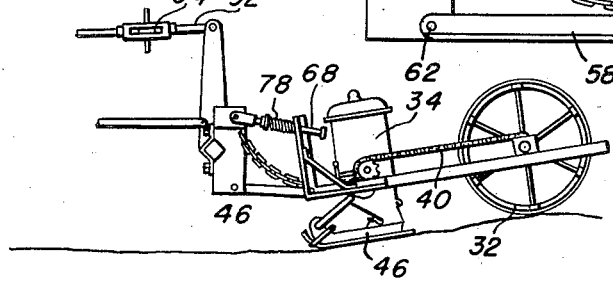
Floyd R. Bridger, Jr.
INVENTOR.
BY Clarence A. O'Brien
and Harvey B. Jacobson
Attorneys Patented May 8, 1951

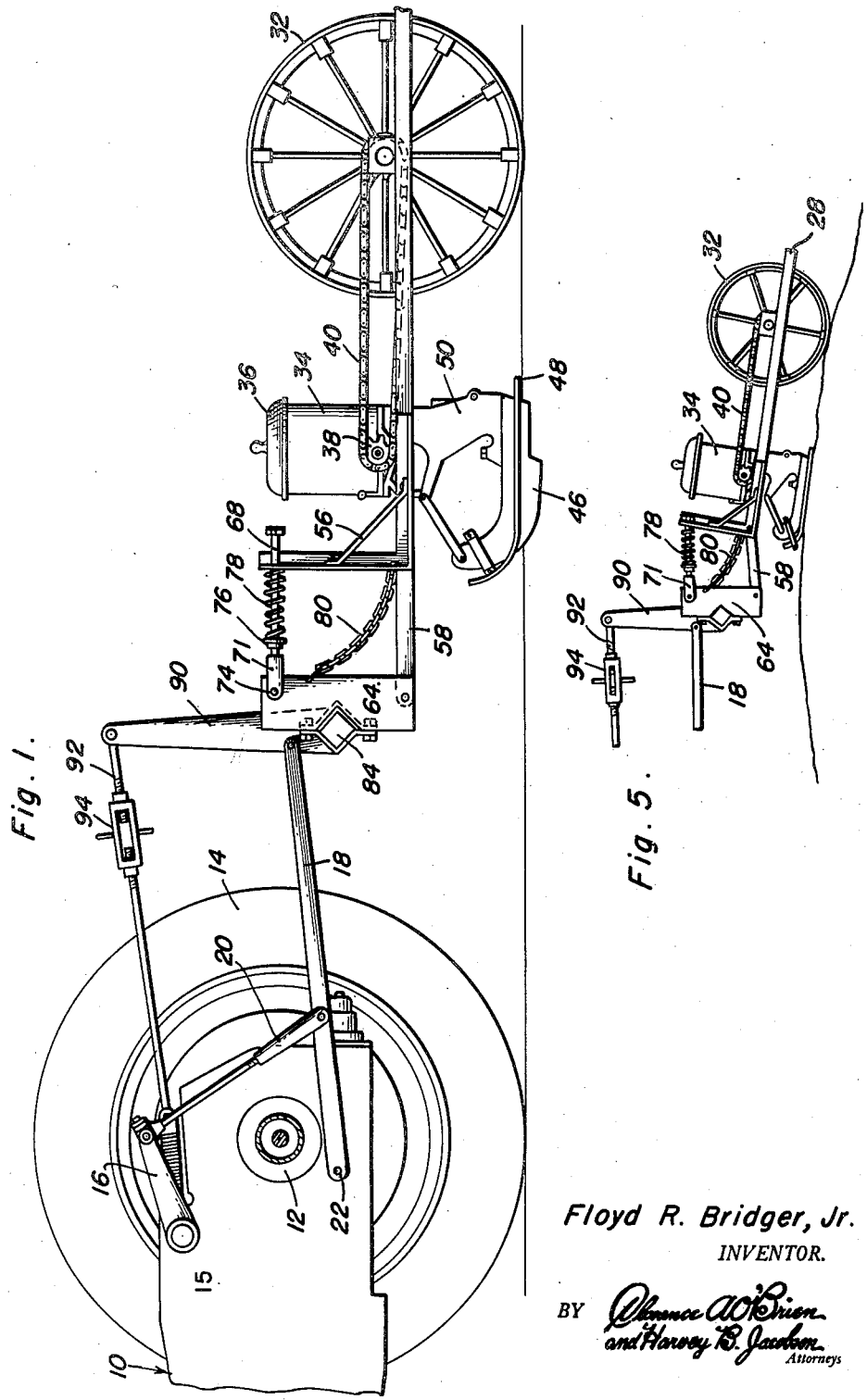

2,551,870

UNITED STATES PATENT OFFICE 2,551,870

FLEXIBLE TRACTOR PLANTER ATTACHING ASSEMBLY

Floyd R. Bridger, Jr., Jonesboro, Ark.

Application October 22, 1948, Serial No. 55,916

6 Claims. (Cl. 97—199)

This invention relates to draft implements and attachments adapted to be directly connected to tractors and more particularly to tractor attachments which can be quickly attached to or detached from tractors.

The object of the instant invention is to enable a plurality of planting attachments to be attached to the rear supporting structure of a tractor in a transversely adjustable manner so that the planting tools may be towed directly in the rear of the rear axle structure of the tractor and between the rear wheels of the tractor and also at points outside the rear wheels of the tractor.

Another important object of this invention is to maintain pressure on the drive wheel of the planter and also to provide means by which the pressure maintained on the drive wheel may be adjusted.

Another object of this invention is to provide means by which the pressure may be maintained on the drive wheel of the planter regardless of the unevenness of the terrain or the contour of the ground.

Another object of this invention is to provide means for attaching a multiple row planting attachment to a pulling vehicle so that each attachment responds individually to the unevenness of the terrain and planting may be carried out at a uniform depth regardless of the unevenness of the terrain and regardless of the position of one planter in relation to the other planter or more planters due to the different height of the rows.

These and ancillary objects and structural features of merit are attained by this invention, a preferred embodiment of which is set forth in the following description and illustrated in the accompanying drawings, wherein:

Figure 1 is an elevational view of a planting attachment and attaching means, constructed in accordance with the principles of this invention, and shown in operative attachment to the rear portion of a tractor, with one wheel of the tractor removed;

Figure 2 is a top plan view of a pair of cooperative planting attachments, constituting a multiple row planting attachment adapted to be connected to the rear of the tractor by means of the attaching structure, shown in plan;

Figure 3 is an enlarged sectional view taken on line 3—3 of Figure 2;

Figures 4 and 5 are side elevational views of the planting unit, illustrating the means provided whereby the planting unit may individually respond to the unevenness of the terrain.

Referring now more particularly to the drawings, there is shown the rear structure of a tractor, generally designated by the character reference 10 and being of conventional design and structure. The tractor includes a rear axle structure 12 and a rear wheel 14. The forward portion of the tractor, not shown, is that common to any tractor and particularly to a tractor of the tricycle type. Mounted on the transmission housing 15 of the tractor is a power lift means, preferably adapted to be driven hydraulically or driven mechanically by the motor of the tractor in any conventional manner, the same including a lift arm 16 and rearwardly extending arms 18 connected by means of levers 20 to the lift arm, the arms 18 being pivoted to the tractor as at 22.

The planter attachments generally designated by the character reference 24 and 26 are adapted to be detachably associated with the lift arm and secured to the tractor.

The planter attachments are formed similar in every respect, inasmuch as a plurality of the attachments may be secured by this invention to the tractor. Therefore, it is believed that a description of one of the planter attachments will suffice to disclose the novelty of this invention.

The planter attachment 26 includes a rectangular frame 28 within which is transversely journaled a shaft 30 for a driving or planting wheel 32. A hopper 34 is mounted on a shaft journaled between the frame forwardly of the planting wheel and is provided with a lid 36. The hopper 34 has a dispensing means actuated by a sprocket wheel 38 driven by means of a chain 40 trained over a sprocket wheel 42 fixed on the axle 30 of the driving wheel. The sprocket 38 is secured on the shaft 44 disposed transversely in the frame. Of course, a plow shoe 46 and runner assembly 48 depends from the hopper, connected thereto by means of a dispensing tube 50.

The foregoing structure constitutes a conventional one-row planter, the planter attachment 24 being employed for two rows and other similar attachments being employed for multiple row planting.

Means is provided for flexibly and detachably attaching the planter 26 to the tractor or similar pulling vehicle and includes a pair of angular frame members 52 and 54 which are secured to the sides of the rectangular frame, adjacent the hopper 34 and extend upwardly parallel with the hopper. The right angular frame members 52 and 54 are rigidified by bracing bars 56. Connecting bars 58 are secured by pivot pins 60 to the right angular frame bars 52 and 54, as seen in Figure 3 and the opposite ends of the connecting bars are pivotally attached as at 62 to plates 64 and 66. Rods 68 and 70 are slidably disposed through an aperture, not shown, in the upper end of the frame members 52 and 54 and terminate in clevised bifurcated ends 71 and 72 which are pivoted to the upper ends of the plates 64 and 66 by means of pivot pins 74. The rods are externally threaded along the shank portion and a nut and stop plate 76 is disposed thereon, springs 78 being disposed about the shank of the rod between the frame members and the stop plates. A stop chain 80 extends between the frame members and the plates.

The plates 64 and 66 are connected by transverse integral webs 82 having angular sides 83 and 85. A bar 84 extends transversely at the rear structure of the tractor and is spaced therefrom. The web 82 is secured to the bar, and the sides thereof are clamped thereon by means of clamps 86 and 88. A plate 90 extends upwardly from the center of the bar and is secured to a link arm 92, having a turnbuckle 94. The arms 18 are secured to plates 97 integrally carried by the bar 84.

In operation, any desired amount of pressure can be applied to the planter drive wheel 32, depending upon the type of tractor that the assembly is attached to. For example, when the assembly is drawn on a tractor with the hydraulic lifting means, illustrated in Figure 1, by tightening the turnbuckle 94 for the upper link arm 92, the link arm can be lengthened or shortened. When the link arm is lengthened, it rotates the transverse pull bar which in turn moves the top of the plates 64 and 66 to the rear exerting more pressure on the frame 78, as the rods 68 and 70 slide rearwardly through the right angular frame members. The spring, of course, exerts pressure on the right angular frame members and thereby exerts pressure on the drive wheel 32. Of course, the reverse is true if the upper link arm is shortened to move the upper end of the plates 64 and 66 forwardly releasing the tension of the spring.

Another means may be employed and may be used as an attaching installation, where the hydraulic lift is not carried by the tractor. In this respect, the pull bar 84 will be fastened directly to the tractor cultivator beams or to the lifting device of the tractor. Of course, then the pressure of the drive wheel will be regulated by moving the nut 76 and the rods 68 and 70 in order to compress or decrease the compression of the spring 78, which in turn increases or decreases the pressure of the drive wheel 32.

Of course, the pressure is maintained on the drive wheel regardless of the position of the planter, as can be seen in Figures 4 and 5. In Figure 5, the planter is approaching a high point in the ground and the planter frame is maintained in a proper position, with the plate connecting rod pivoting downwardly and the spring exerting pressure on the frame members 52.

Should one row be higher than the other, the entire planter on the higher row will be properly operated at the correct travelling level, since each planter operates separately and reacts individually to the contour of the ground.

Means is provided for detachably associating the rear ends of the planter attachments 26 and 28 and comprises a pair of laterally extending bars 96 and 98 which are pivoted to the frames or the planter attachments and detachably associated at their outer ends by means of bolt assemblies 100. Thus, it is seen that there is provided means for individually but collectively associating a plurality of planters or other agricultural implements to a power unit.

Having described the invention, what is claimed as new is:

1. In combination with a tractor, means for attaching an implement thereto, said means including a pull bar transversely disposed rearwardly of the tractor, coupling means between the pull bar and tractor, an attaching member adjustably mounted on the pull bar, a support bar pivoted to the attaching member and to the implement, a bar vertically mounted on the implement, a connecting rod slidably carried transversely by the bar and pivotally connected to the attaching member and spring means carried by the rod and disposed between the bar and attaching member.

2. In combination with a tractor having a power lift means, coupling means for an implement including a pull bar transversely disposed rearwardly of the tractor, connecting means between the lift means and the pull bar, a rearwardly extending vertical plate adjustably clamped on the pull bar, a bar vertically mounted on the implement, supporting means pivotally connected to the lower end of the plate and to the implement, a connecting rod slidably carried transversely by the bar and pivotally connected to the upper end of the plate and resilient means carried by the rod for urging the bar and implement downwardly and yieldingly maintaining the implement in ground contact.

3. In combination with a tractor having a lift means, draft means for an implement including a pull bar disposed transversely rearwardly of the tractor, connecting means between the pull bar and lift means, a vertical plate adjustably clamped on the pull bar, a bar vertically mounted on the implement, a supporting bar pivotally connected to the lower ends of the plate and to the bar, a connecting rod slidably carried transversely by the bar and pivotally connected to the upper end of the plate and resilient means disposed in the rod between the plate and bar for yieldingly maintaining the implement in ground contact.

4. In combination with a tractor having a lift means, draft means for an implement including a pull bar disposed transversely rearwardly of the tractor, connecting means between the pull bar and lift means, a vertical plate adjustably clamped on the pull bar, a bar vertically mounted on the implement, a supporting bar pivotally connected to the lower ends of the plate and to the bar, a connecting rod slidably carried transversely by the bar and pivotally connected to the upper end of the plate and resilient means disposed in the rod between the plate and bar for yieldingly maintaining the implement in ground contact, and flexible means connected between the upper end of the plate and the lower end of the bar for limiting the movement of the bar from the plate.

5. In combination with a tractor having a lift means, draft means for an agricultural implement including a pull bar disposed transversely rearwardly of the tractor, an arm projecting upwardly from the pull bar, adjustable supporting means connecting between the arm and the tractor, means for connecting the pull bar with the lift means, a pair of vertical plates adjustably clamped on the pull bar, a pair of vertical bars mounted on the implement, supporting members pivotally connected to the lower ends of the plates and to the bars, parallel connecting rods transversely slidably carried by the upper ends of the bars and pivotally connected to the upper ends of the plates, resilient means carried by the rods for yieldingly maintaining the implement in ground contact and flexible connecting means between the upper ends of the plates and the lower ends of the bars for limiting the movement of the bars from the plates.

6. Coupling means for attaching an implement to a tractor including a pull bar, a vertical plate detachably and slidably clamped on the pull bar, a vertical bar mounted on the implement, a support bar pivotally connected to the lower ends of the plate and to the bar, a connecting means slidably carried transversely by the upper end of the vertical bar and pivotally connected to the upper end of the plate for yieldingly maintaining the implement in ground contact and flexible connecting means between the plate and vertical bar for limiting the movement of the said bar from the plate.

FLOYD R. BRIDGER, Jr.

REFERENCES CITED

The following references are of record in the file of this patent:

UNITED STATES PATENTS

| Number | Name | Date |
| --- | --- | --- |
| 1,230,261 | Zelle | June 19, 1917 |
| 1,348,862 | Genung | Aug. 10, 1920 |
| 1,632,345 | Muehlhause | June 14, 1927 |
| 1,696,562 | Allen | Dec. 25, 1928 |
| 1,768,019 | Abeling et al. | June 24, 1930 |
| 2,015,584 | Benjamin | Sept. 24, 1935 |
| 2,054,513 | Kriegbaum et al. | Sept. 15, 1936 |
| 2,309,750 | Carrington | Feb. 2, 1943 |
| 2,336,848 | Cruse | Dec. 14, 1943 |
| 2,346,757 | Horner | Apr. 18, 1944 |
| 2,363,749 | Rude | Nov. 28, 1944 |
| 2,414,114 | Martin | Jan. 14, 1947 |